2 Sheets--Sheet 1.
A. POPE.
Manufacture of Peat into Fuel.
No. 148,753. Patented March 17, 1874.
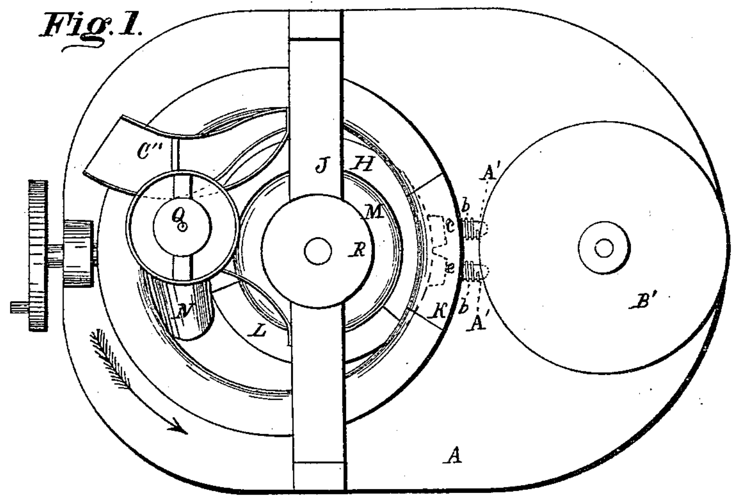
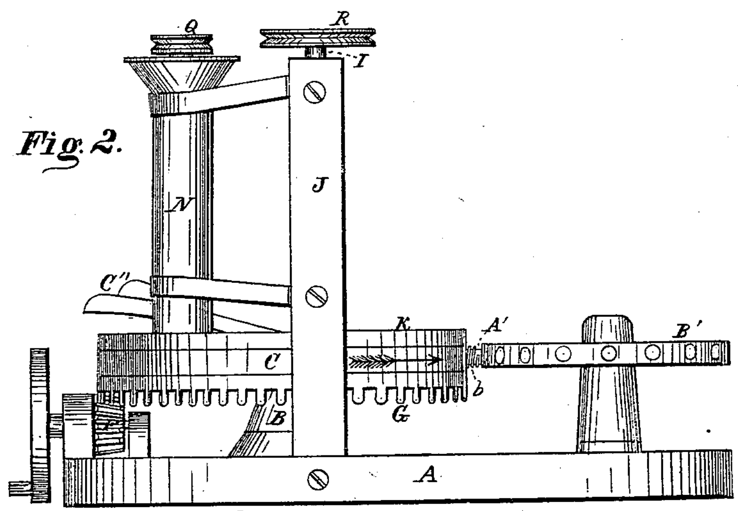
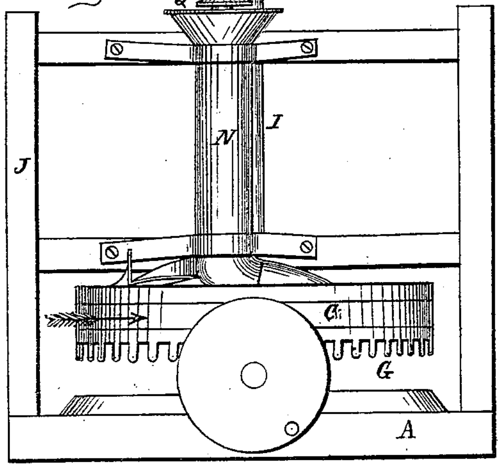
Witnesses.
A. F. Cornell.
J. A. Browne,
Inventor.
Alton Pope.
Per. Burridge & Co.
Attys.
AM. PHOTO-LITHOGRAPHIC Co. N.Y. (OSBORNE'S PROCESS.)

A. POPE.

Manufacture of Peat into Fuel.

No. 148,753. Patented March 17, 1874.

*Witnesses.*

A. F. Cornell.

J. A. Browne.

*Inventor.*

Alton Pope.

Per Burridge & Co.

Attys.

AM. PHOTO-LITHOGRAPHIC Co. N.Y. (OSBORNE'S PROCESS)

UNITED STATES PATENT OFFICE.

ALTON POPE, OF CLEVELAND, OHIO.

IMPROVEMENT IN THE MANUFACTURE OF PEAT INTO FUEL.

Specification forming part of Letters Patent No. 148,753, dated March 17, 1874; application filed March 2, 1874.

*To all whom it may concern:*

Be it known that I, ALTON POPE, of Cleveland, in the county of Cuyahoga and State of Ohio, have invented a certain new and Improved Machine for Treating Peat for Fuel, of which the following is a complete description, reference being had to the accompanying drawings making part of this specification.

Figure 4:
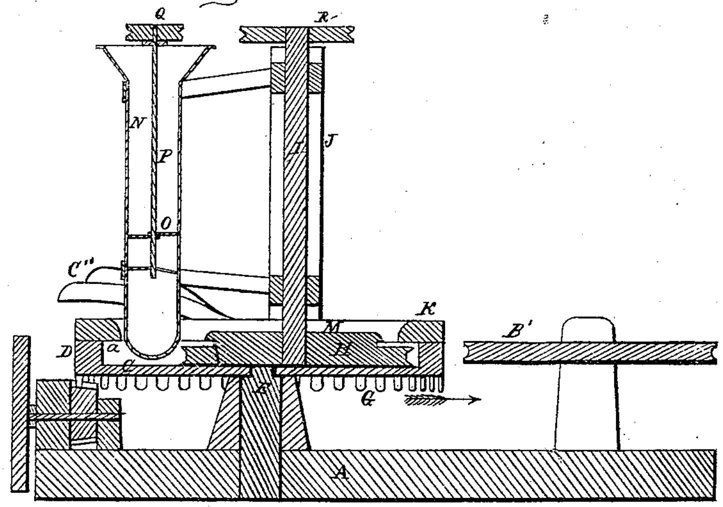
Figure 5:
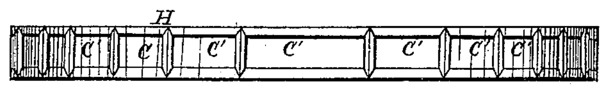
Figure 6:
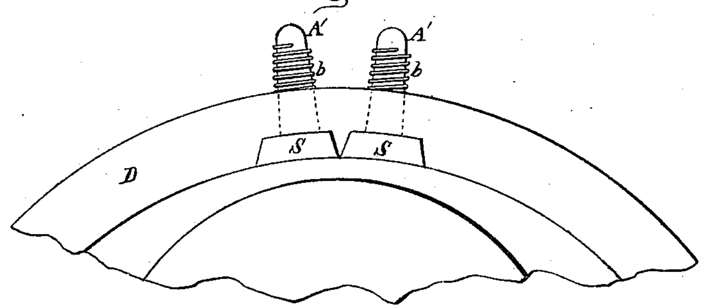

Figure 1 is a plan view of the machine. Figs. 2 and 3 are side elevations. Fig. 4 is a transverse vertical section. Figs. 5 and 6 are detached sections, enlarged views.

Like letters of reference refer to like parts in the several views.

The nature of this invention relates to a machine for preparing peat for fuel; and the object thereof is to give the peat such a shape, size, and condition as to make it available for burning, and which is accomplished by the employment of a packer revolving molds and squeezers, the construction and operation of which are as follows:

In the drawing, A represents a platform, and B a step, on which is supported and revolves a disk-wheel, C, Fig. 3, provided with a marginal rim, D, Fig. 6. E, Fig. 4, is the axial point of the disk-wheel, and upon which it is made to revolve horizontally by the pinion F, Fig. 2, put into engagement with the circle of cogs G on the under side of the disk-wheel. Eccentric to the axis of the disk-wheel referred to is arranged a revolving mold, H, Figs. 1 and 4, of which I is the spindle, secured in the cross-pieces of the frame J, Fig. 3. The mold sits flat down upon the plane of the disk-wheel, as shown in Fig. 4, and rotates thereon, as will hereinafter be shown. To the marginal rim D, above described, is secured a flange, K, Fig. 4, projecting inwardly over the rim, and under which the edge of the mold projects, as shown in Fig. 4. In consequence of the eccentric relation of the mold to the disk-wheel it brings the mold close to one side of the rim of said disk-wheel, and a corresponding distance therefrom on the opposite side, thereby leaving a wide space, *a*, Fig. 4, between the edge of the mold and the rim of the disk-wheel. Said space *a* is partially covered by a lid, L, Fig. 1, the edge of which is covered by one side of the disk M, forming a part of the mold H, as shown in Fig. 4. The lid or cover referred to extends about one-third to one-half of the distance around the inside of the rim of the disk-wheel. The object of the plate or lid is to keep the peat in place between the mold and the rim of the disk-wheel, so that it will not spread or be forced up while it is being pressed into the forms of the mold aforesaid. N is a feeder or hopper, in which is fitted a screw or packer, O, Fig. 4, revolved by the shaft P and pulley Q, driven by a belt from the pulley R. S S, Fig. 6, are squeezers, fitted in the inside of the rim D. The stems A′ thereof project through the rim so far as to admit of being coiled around them a spring, *b*, whereby said squeezers are drawn into the rim. Recesses are formed therein for their admission, as shown in Fig. 6, which represents an enlarged view of a section of the disk-wheel. The squeezers are also indicated by the dotted lines *c*, Fig. 1. The purpose of said squeezers and the wheel B′ co-operating therewith will presently be shown. In the periphery of the mold above referred to are made recesses or forms C′, Fig. 5, into which the peat is pressed and formed into blocks or cakes for the convenience of handling.

Having described the machine, the practical operation of the same is as follows: The peat to be operated on is thrown into the hopper or conveyer N, from which it is packed into the space *a* above referred to. As the disk-wheel C is made to revolve in the direction of the arrow the peat is carried around with it, and is forced into the molds or forms C′ in consequence of the narrowing up of the space between the mold and the rim or side of the disk-wheel, caused by the eccentric relation of the revolving mold to the disk, which, at the side facing the wheel B′, is quite close, so close that the pressure exerted upon the peat is so great as to render it solid and compact. Further pressure is exerted upon the peat while in the molds by the squeezers S, which, when the disk-wheel C in its revolution comes to the position as shown in Fig. 1, said squeezers are pushed forward against the molds by the stems A′, which, in consequence of their engagement with the wheel B′, are pushed in, thereby forcing the squeezers hard upon the mold and peat therein. As the disk-wheel leaves the wheel B′ the squeezers are drawn back from the molds by the springs $b$. The peat falls from the molds when the pressure is removed therefrom, and is then carried out from the machine by the conductor C'' to the side for use.

Two squeezers only are shown in the drawing, but in practical use there will be arranged around in the rim of the disk-wheel a series of squeezers, corresponding in number to the number of the recesses or forms C' in the revolving mold H—that is to say, a squeezer for each form. To give the peat a primary pressure is the purpose of the packer or worm O in the hopper, which is made to revolve by the belt and pulleys above described, motion being given to the pulley R by the revolving molds, the molds being caused to revolve by the disk-wheel and the frictional resistance of the peat as it is carried around and pressed between them.

The operation of this machine is simple and certain in its movement, and for the purpose intended is very efficient, as the condition of the pressed peat testifies.

Without essentially changing the nature of the construction of the machine, it may be applied to other uses than that of peat for compressing material between the two revolving surfaces, the disk-wheel, and the mold, one being driven by power, and the other by friction, as specified.

What I claim as my invention, and desire to secure by Letters Patent, is—

1. The revolving mold H, arranged eccentrically to the disk-wheel C, and operating conjointly therewith, in the manner substantially as described, and for the purpose set forth.

2. The squeezers S S, constructed as described, in combination with the disk-wheel C, revolving mold H, and wheel B', substantially in the manner as described, and for the purpose specified.

3. In combination with the disk-wheel C and revolving mold H, the hopper N, and screw or packer O, substantially in the manner as described, and for the purpose set forth.

4. The combination of the pinion F, disk-wheel C, molds H, squeezers S S, wheel B', hopper N, packer O, and conductor C'', substantially in the manner as set forth, and for the purpose set forth.

5. The combination of the disk-wheel C, revolving mold H, and conductor C'', as and for the purpose set forth.

ALTON POPE.

Witnesses:
W. H. BURRIDGE,
A. F. CORNELL.